US011506756B2

(12) United States Patent
Wang et al.

(10) Patent No.: US 11,506,756 B2
(45) Date of Patent: Nov. 22, 2022

(54) BEAM REFLECTING UNIT FOR LIGHT DETECTION AND RANGING (LIDAR)

(71) Applicant: BEIJING VOYAGER TECHNOLOGY CO., LTD., Beijing (CN)

(72) Inventors: Chao Wang, Mountain View, CA (US); Lingkai Kong, Mountain View, CA (US); Yonghong Guo, Mountain View, CA (US); Wenbin Zhu, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 302 days.

(21) Appl. No.: 16/922,465

(22) Filed: Jul. 7, 2020

(65) Prior Publication Data

US 2021/0382141 A1 Dec. 9, 2021

Related U.S. Application Data

(63) Continuation-in-part of application No. 16/897,121, filed on Jun. 9, 2020.

(51) Int. Cl.
*G01S 7/481* (2006.01)
*G02B 26/08* (2006.01)
*G01S 7/484* (2006.01)
*G01S 17/89* (2020.01)
*G01S 17/931* (2020.01)

(52) U.S. Cl.
CPC .............. *G01S 7/481* (2013.01); *G01S 7/484* (2013.01); *G01S 17/89* (2013.01); *G01S 17/931* (2020.01); *G02B 26/0833* (2013.01)

(58) Field of Classification Search
None
See application file for complete search history.

(56) References Cited

U.S. PATENT DOCUMENTS

| | | | | |
|---|---|---|---|---|
| 2017/0357000 | A1* | 12/2017 | Bartlett | .................... G01S 7/484 |
| 2018/0196242 | A1* | 7/2018 | Maeda | ............... G02B 26/0833 |
| 2020/0191960 | A1* | 6/2020 | Zheng | ..................... G01S 7/484 |
| 2020/0341122 | A1* | 10/2020 | Ahn | ...................... G02B 5/0278 |

* cited by examiner

*Primary Examiner* — Eileen M Adams
(74) *Attorney, Agent, or Firm* — Bayes PLLC (57) ABSTRACT

Embodiments of the disclosure provide receivers for light detection and ranging (LiDAR). In an example, a receiver includes a beam reflecting unit having a plurality of digital micromirror devices (DMDs). The beam reflecting unit is configured to receive an input light beam returned from an object being scanned by the LiDAR, reflect a signal in the input light beam by at least one first DMD selectively switched to an "ON" state at an operation angle to form an output signal towards a detector, reflect a noise signal in the input light beam away from the detector by at least one second DMD selectively switched to an "OFF" state at a non-operation angle. The receiver also includes the detector configured to receive the output signal.

19 Claims, 9 Drawing Sheets

BEAM REFLECTING UNIT FOR LIGHT DETECTION AND RANGING (LIDAR)

CROSS REFERENCE TO RELATED APPLICATION

This application is a continuation in part of U.S. application Ser. No. 16/897,121, filed on Jun. 9, 2020, entitled "BEAM REFLECTING UNIT FOR LIGHT DETECTION AND RANGING (LIDAR)," which is hereby incorporated by reference in its entirety.

TECHNICAL FIELD

The present disclosure relates to a Light Detection and Ranging (LiDAR) system, and more particularly to a LiDAR receiver having a beam reflecting unit.

BACKGROUND

LiDAR systems have been widely used in autonomous driving and producing high-definition maps. For example, LiDAR systems measure distance to a target by illuminating the target with pulsed laser light and measuring the reflected pulses with a sensor. Differences in laser return times and wavelengths can then be used to make digital three-dimensional (3-D) representations of the target. The laser light used for LiDAR scan may be ultraviolet, visible, or near infrared. Because using a narrow laser beam as the incident light from the scanner can map physical features with very high resolution, a LiDAR system is particularly suitable for applications such as high-definition map surveys.

The pulsed laser light beams emitted by a LiDAR system are typically directed to multiple directions to cover a field of view (FOV). As a result, LiDAR system requires a receiver that can receive the returned light signals from different directions. To realize this receiving requirement, most LiDAR systems implement one of two designs: (1) a rotational mirror to deflect the return light signals so that they are all received by a static detector, or (2) using an array of detectors to receive the returned light signals within an range of directions.

The performance of the conventional detector arrays, however, is limited in two aspects. First, in the detector array, there are typically gaps between the sensor elements, which cause a signal loss. Secondly, the detector array employs a high-speed electrical switch to switch the signal among the different sensor elements. This not only increases a design complexity, but also limits the scanning speed, as the switching speed is limited by the response speed of the electrical switches. As a result, receivers with conventional detector arrays face the two-folded issues of signal loss and limited speed.

Embodiments of the disclosure address the above problems by an improved receiver having a beam reflecting unit for LiDAR.

SUMMARY

Embodiments of the disclosure provide a receiver for light detection and ranging LiDAR. The receiver includes a beam reflecting unit having a plurality of digital micromirror devices (DMDs). The beam reflecting unit is configured to receive an input light beam returned from an object being scanned by the LiDAR, reflect a signal in the input light beam by at least one first DMD selectively switched to an "ON" state at an operation angle to form an output signal towards a detector, reflect a noise signal in the input light beam away from the detector by at least one second DMD selectively switched to an "OFF" state at a non-operation angle. The receiver also includes the detector configured to receive the output signal.

Embodiments of the disclosure also provide another receiver for LiDAR. The receiver includes a beam reflecting unit comprising a plurality of DMDs including a first DMD and a second DMD. The beam reflecting unit is configured to reflect a first signal in a first input light beam from an object being scanned by the LiDAR in a first direction by the first DMD to form a first output signal and reflect a second signal in a second input light beam from the object in a second direction by the second DMD to form a second output signal, the first DMD being different from the second DMD. The receiver also includes a detector that is configured to receive the first and second output signals.

Embodiments of the disclosure also provide a method for receiving a laser beam in a LiDAR. The method includes the following operations. At first, an area on a beam reflecting unit, on which a signal in an input light beam from an object being scanned by the LiDAR impinges, is determined. The beam reflecting unit has a plurality of DMDs. At least one first DMD in the area is switched to an "ON" state is by rotating the at least one first DMD to a respective operation angle. The signal is received on the at least one first DMD. At least one second DMD outside the area is switched to an "OFF" state by rotating the at least one second DMD to a respective non-operation angle. A noise signal in the input light beam is received on the at least one second DMD. The signal is reflected towards a detector. The noise signal is reflected away from the detector.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

The present disclosure is made in a three-dimensional coordinate system, with x-axis, y-axis, and z-axis representing the three dimensions. In the present disclosure, the "fast axis" is parallel to the z-axis, the "slow axis" is parallel to the y-axis, and the "optical axis" is parallel to the x-axis. The z-axis (e.g., the vertical axis/direction) is perpendicular to the x-y plane (e.g., the horizontal/lateral plane), and the x-axis and the y axis is perpendicular to each other. The x-axis/direction and the y-axis/direction can each be referred to as a lateral direction.

In the present disclosure, the "incident direction" of a light beam refers to the direction defined by the incident angle between the light beam and the surface normal of the object the light beam is incident on. In the present disclosure, the "exiting direction" of a light beam refers to the direction defined by the exiting angle between the light beam and the surface normal of the object the light beam is exiting.

In the present disclosure, an "incident surface" refers to the surface on which a light beam is incident, and an "exiting surface" refers to the surface from which a light beam is exiting. In some applications, incident and exiting surfaces of an object (e.g., a DMD) are both referred to as the top surface of the object.

In the present disclosure, an "operation angle" refers to the angle at which a light beam is deflected towards and collected by, e.g., a photosensor, and an "non-operation angle" refers to the angle at which a light beam is deflected away and not collected.

In the present disclosure, the term "nominal/nominally" refers to a desired, or target, value of a characteristic or parameter for a component or a process operation, set during the design phase of a product or a process, together with a range of values above and/or below the desired value. The range of values can be due to slight variations in manufacturing processes or tolerances. As used herein, the term "about" indicates the value of a given quantity that can vary based on a particular technology node associated with the subject semiconductor device. Based on the particular technology node, the term "about" can indicate a value of a given quantity that varies within, for example, 10-30% of the value (e.g., ±10%, ±20%, or ±30% of the value).

In the present disclosure, the distance between two objects, e.g., a lens and an AO beam deflecting unit, is defined to be the distance between the centers (e.g., geometric centers) of the objects.

Figure 1:
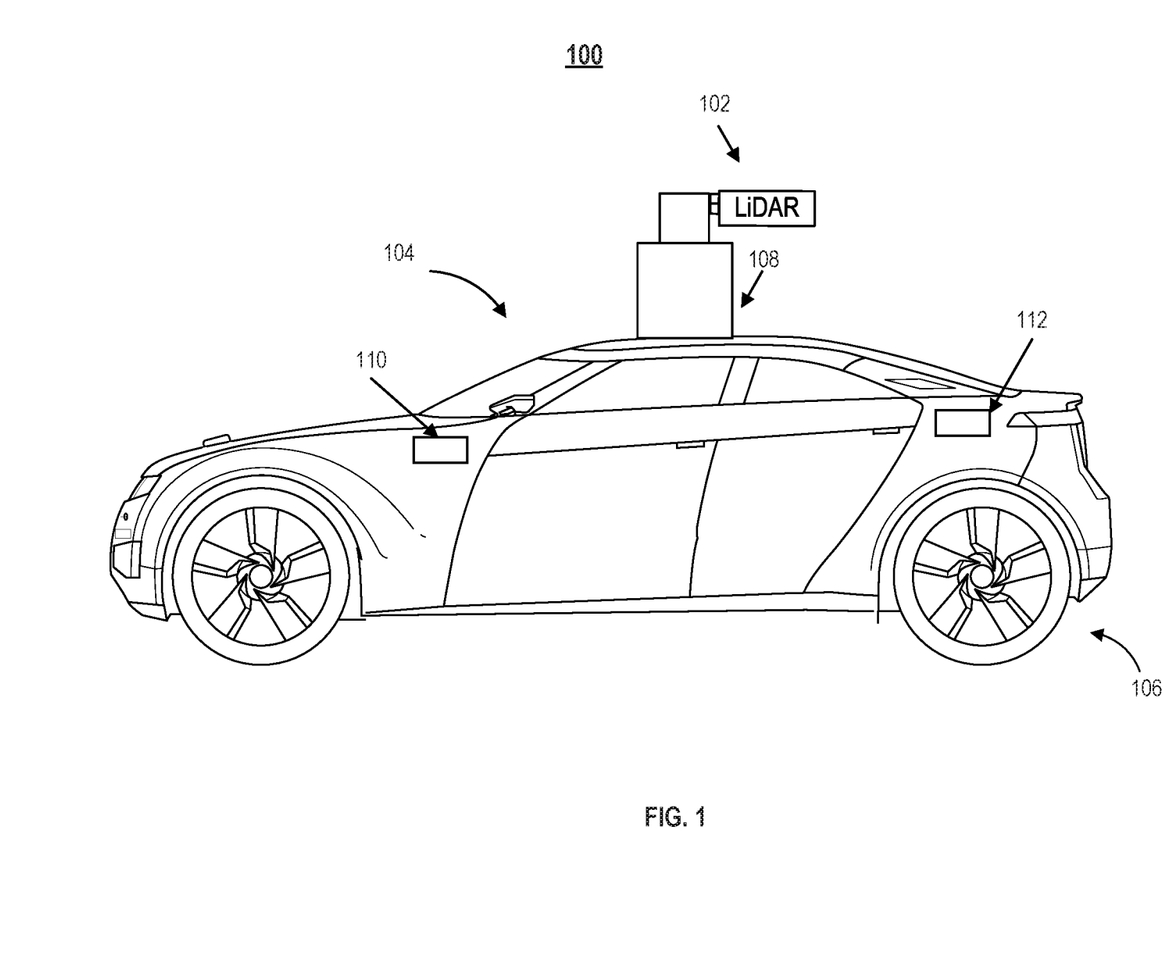
FIG. 1 illustrates a schematic diagram of an exemplary vehicle equipped with a LiDAR system, according to embodiments of the disclosure.

FIG. 1 illustrates a schematic diagram of an exemplary vehicle 100 equipped with a LiDAR system 102, according to embodiments of the disclosure. Consistent with some embodiments, vehicle 100 may be a survey vehicle configured for acquiring data for constructing a high-definition map or 3-D modeling. It is contemplated that vehicle 100 may be any suitable moving vehicle such as an electric vehicle, a fuel cell vehicle, a hybrid vehicle, or a conventional internal combustion engine vehicle. Vehicle 100 may have a body 104 and at least one wheel 106. Body 104 may be any body style, such as a sports vehicle, a coupe, a sedan, a pick-up truck, a station wagon, a sports utility vehicle (SUV), a minivan, or a conversion van. In some embodiments of the present disclosure, vehicle 100 may include a pair of front wheels and a pair of rear wheels, as illustrated in FIG. 1. However, it is contemplated that vehicle 100 may have less wheels or equivalent structures that enable vehicle 100 to move around. In some embodiments of the present disclosure, vehicle 100 may be configured to be operated by an operator occupying the vehicle, remotely controlled, and/or autonomous.

As illustrated in FIG. 1, vehicle 100 may be equipped with LiDAR system 102 mounted to body 104 via a mounting structure 108. Mounting structure 108 may be an electromechanical device installed or otherwise attached to body 104 of vehicle 100. Vehicle 100 may be additionally equipped with a sensor 110 inside or outside body 104 using any suitable mounting mechanisms. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3-D sensing performance.

Consistent with some embodiments, LiDAR system 102 and sensor 110 may be configured to capture data as vehicle 100 moves along a trajectory. For example, a transmitter of LiDAR system 102 is configured to scan the surrounding and acquire point clouds. LiDAR system 102 measures distance to a target by illuminating the target with pulsed laser light and measuring the reflected pulses with a receiver. The laser light used for LiDAR system 102 may be ultraviolet, visible, or near infrared. In some embodiments of the present disclosure, LiDAR system 102 may capture point clouds. As vehicle 100 moves along the trajectory, LiDAR system 102 may continuously capture data. Each set of scene data captured at a certain time range is known as a data frame.

As illustrated in FIG. 1, vehicle 100 may be additionally equipped with sensor 110, which may include sensors used in a navigation unit, such as a Global Positioning System (GPS) receiver and one or more Inertial Measurement Unit (IMU) sensors.

Consistent with the present disclosure, vehicle 100 may include a local controller 112 inside body 104 of vehicle 100 or communicate with a remote computing device, such as a server (not illustrated in FIG. 1), for controlling the operations of LiDAR system 102 and sensor 110. In some embodiments of the present disclosure, controller 112 may have different modules in a single device, such as an integrated circuit (IC) chip (implemented as an application-specific integrated circuit (ASIC) or a field-programmable gate array (FPGA)), or separate devices with dedicated functions. In some embodiments of the present disclosure, one or more components of controller 112 may be located inside vehicle 100 or may be alternatively in a mobile device, in the cloud, or another remote location. Components of controller 112 may be in an integrated device or distributed at different locations but communicate with each other through a network (not shown).

Figure 2:
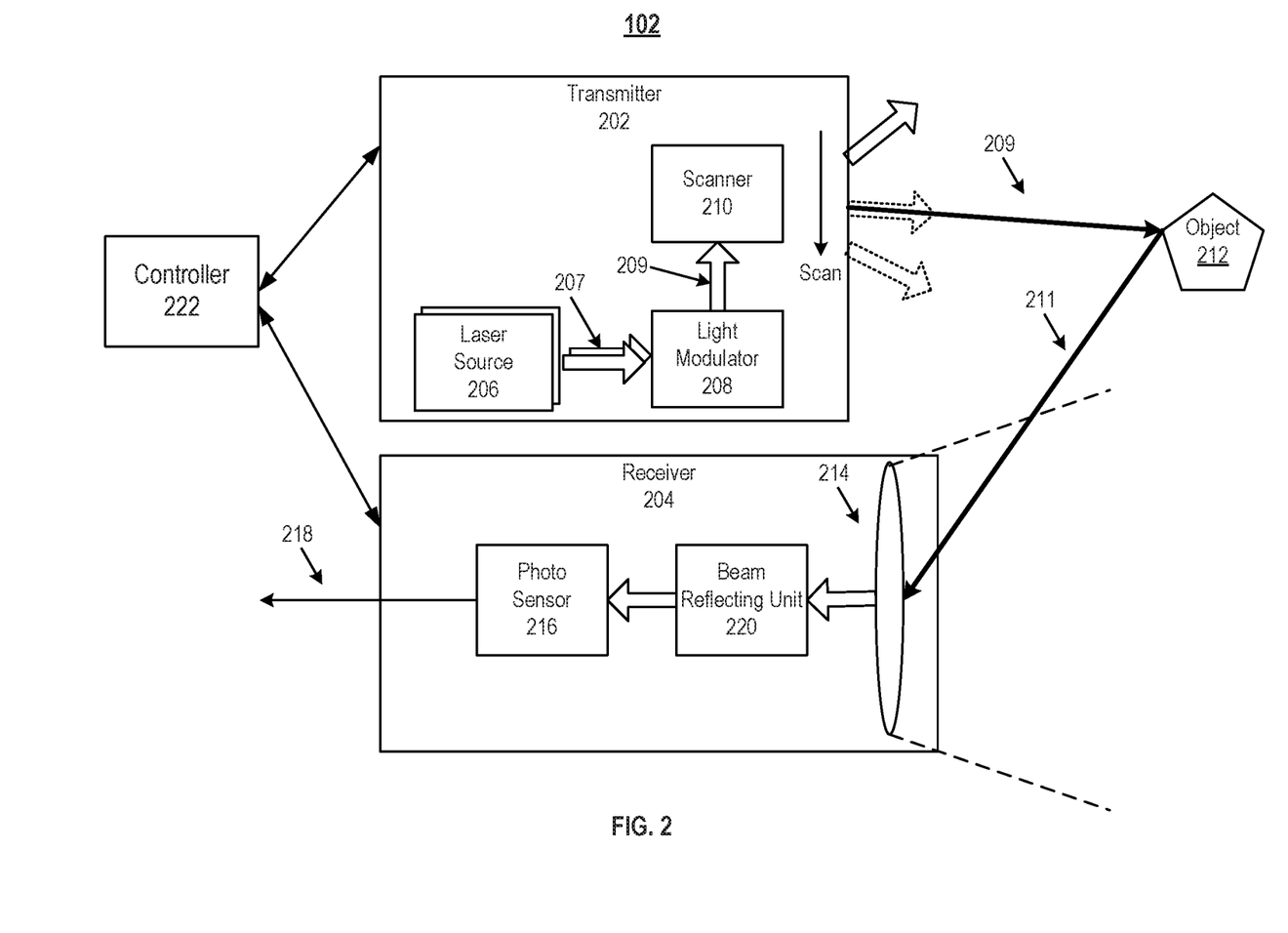
FIG. 2 illustrates a block diagram of an exemplary LiDAR system having a receiver with a beam reflecting unit, according to embodiments of the disclosure.

FIG. 2 illustrates a block diagram of an exemplary LiDAR system 102 having a receiver 204 with a beam reflecting unit 220, according to embodiments of the disclosure. LiDAR system 102 may include a transmitter 202, receiver 204, and a controller 222. Transmitter 202 may emit laser beams within a scan angle. Transmitter 202 may include one or more laser sources 206, a light modulator 208, and a scanner 210.

As part of LiDAR system 102, transmitter 202 can sequentially emit a stream of pulsed laser beams in different directions within its scan angle, as illustrated in FIG. 2. A laser source 206 may be configured to provide a native laser beam 207 in a respective incident direction to light modulator 208. In some embodiments of the present disclosure, each laser source 206 may generate one or more pulsed laser beams in the ultraviolet, visible, or near infrared wavelength range.

Laser source 206 can include any suitable laser emitting device(s) such as one or more pulsed laser diode (PLD). Depending on the light-emitting materials (e.g., semiconductor materials) in the laser emitting devices, the wavelength of native laser beam 207 provided by a PLD may be any suitable value(s) that can be detected by receiver 204. For example, the wavelength of native laser beam 207 may be smaller than 1,100 nm, such as 405 nm, between 445 nm and 465 nm, between 510 nm and 525 nm, 532 nm, 635 nm, between 650 nm and 660 nm, 670 nm, 760 nm, 785 nm, 808 nm, 848 nm, or 905 nm. Light modulator 208 can spatially collimate and combine multiple laser beams provided by multiple laser sources 206 into a single combined laser beam and minimize the beam divergence in the combined laser beam.

Scanner 210 may be configured to emit combined laser beam 209 to an object 212 in a scanning direction. Scanner 210 may scan object 212 using combined laser beam 209 combined by light modulator 208, within a scan angle at a scan rate. Object 212 may be made of a wide range of materials including, for example, non-metallic objects, rocks, rain, chemical compounds, aerosols, clouds and even single molecules. The wavelength of combined laser beam 209 may vary based on the composition of object 212. At each time point during the scan, scanner 210 may emit combined laser beam 209 to object 212 in the scanning direction within the scan angle. Scanner 210 may also include optical components (e.g., lenses, mirrors) that can focus pulsed laser light into a narrow laser beam to increase the scan resolution and range of object 212.

As part of LiDAR system 102, receiver 204 may be configured to detect a returned laser beam 211 from object 212 in a direction other than the scanning direction. After collecting and sensing the laser beams, receiver 204 can output an electrical signal reflecting the intensity of the returned laser beams. Upon contact, combined laser beam 209 can be reflected by object 212 via backscattering, such as Rayleigh scattering, Mie scattering, Raman scattering, and fluorescence, forming returned laser beam 211 towards receiver 204. Returned laser beam 211 may be returned from object 212 and have the same wavelength as combined laser beam 209. As illustrated in FIG. 2, receiver 204 may include a lens 214, a photosensor 216, and a beam reflecting unit 220, consistent with the embodiments of the present disclosure. For illustrative purposes, in FIG. 2, beam reflecting unit 220 is depicted to be positioned between lens 214 and photosensor 216. As described below, beam reflecting unit 220 can be placed between lens 214 and photosensor 216, and/or between object 212 and lens 214. The actual placement of beam reflecting unit 220 should not be limited by the depiction in the figures. Lens 214, as an example of a beam converging device, may be configured to collect light from a respective direction in its FOV. At each time point during the scan, returned laser beam 211 may be collected by receiver 204, e.g., by lens 214 or beam reflecting unit 220, as described in detail as follows.

The present disclosure provides a LiDAR system with an improved receiver by employing a beam reflecting unit. As described in the embodiments of the present disclosure, beam reflecting unit 220 can include a beam reflector that deflect a laser signal (e.g., returned laser beam or returned laser signal) and deflect away the noise signal in an input light beam by reflection. In some embodiments, beam reflector includes an array of light reflecting elements that can individually deflect the laser signal (e.g., the returned laser beam) by reflection. The light reflecting element(s) configured to receive and deflect the laser signal can each be switched to an "ON" state at a high speed, e.g., faster than rotating a conventional rotational mirror in an existing LiDAR system, to timely deflect the laser signal towards a desired direction/location, thus is more suitable for a LiDAR system with high scanning speed. Meanwhile, the light reflecting elements other than the one(s) deflecting the laser signal are switched to an "OFF" state at a high speed to direct away any noise signals in the input light beam.

With beam reflecting unit 220, the detector (e.g., photosensor 216) configured to receive the laser signal can be a single photodetector (e.g., a single piece of photodetector) to cover the entire receiver FOV, instead of a photodetector array. Accordingly, the disclosed receiver reduces the signal loss experienced by the conventional detector array and eliminates the need of circuit switching among the various detector units in the detector array. Instead, it can achieve a very high speed due the high-speed nature of the EO effect.

In some embodiments, the array of light reflecting elements include an array of DMDs, each stabilizing in an "ON" state to (e.g., at an operation angle) deflect light for collection and in an "OFF" state (e.g., at a non-operation angle) to deflect light away. In operation, one or more DMDs may be in the "ON" state to receive and deflect the laser signal in an input light beam towards a desired direction/position, while the remaining DMDs may be in the "OFF" state to receive and deflect away the noise signal in the input light beam. In some embodiments, each DMD is used either in the "ON" state to deflect the laser signal or in the "OFF" state to deflect away the noise signal.

Consistent with some embodiments of the present disclosure, the DMDs in the array may have the same operation angles. For example, the DMDs in a beam reflector can be configured to operate under the same operation angle, and/or the same non-operation angle. Consistent with some other embodiments, the DMDs in a beam reflector can also be configured to operate under more than one operation angle, and each operation angle is configured to direct the laser signal towards the photodetector with desired/improved precision. Various operation angles in a beam reflector can facilitate laser signals from various directions to be effectively deflected to desired directions/locations. In some embodiments, DMDs in a partial/full row can have the same operation angle. In some embodiments, DMDs in a partial/full column can have the same operation angle. In some embodiments, DMDs in each row/column can have a different operation angle. In some embodiments, each DMD in a beam reflector can have a distinct operation angle. The non-operation angle in each of the two configurations can effectively deflect away the noise signals in the input light beams.

Control signals are configured to control the rotation of the DMDs. The number and/or locations of DMDs and their operation angle(s) to receive and reflect the laser signals in a beam reflector can be determined based on the design and fabrication of LiDAR system 102. The control signals may switch the individual DMDs between the "ON" and "OFF" states accordingly, e.g., based on the whether the DMDs have an operation angle desired for the beam reflection. In some embodiments, each DMD is controlled by a separate control signal.

By utilizing the light reflection properties of DMDs, applications can be designed to achieve the light reflection function and filtering out noise signal at the same time. For example, laser beams may be emitted at different scanning angles, and the laser beams are reflected and returned from the object in different directions. Each input light beam received by receiver 204 generally contains a laser signal which is corresponding to the returned laser beam from the object and a noise signal. In some embodiments, one or more DMDs in the array of DMDs of the beam reflector may be rotated to the operation angle to be in the "ON" state, in order to deflect the laser signal in each input light beam to photosensor 216. More specifically, the one or more DMDs may be selected according to the travel direction of each laser signal. For example, the one or more DMDs are those located in the area where the laser signal is expected to impinge on. The beam reflector may reflect the laser signals to different positions on photosensor 216 according to their incoming directions and the reflection angle of the beam reflector. At the same time, the noise signal in the same input light beam may be deflected away, by the remaining DMDs rotated to the "OFF" state. Accordingly, the laser signal in the light beam is selectively reflected while the noise signal is filtered. By using the DMDs in a beam reflector (or beam reflecting unit 220)) to selectively reflect the signals within the input light beams, photosensor 216 can include a single photodetector, rather than a photodetector array, simplifying the structure and/or manufacturing of photosensor 216 while maintaining desirable detection precision. Also, each DMD for receiving and reflecting a laser signal can rotate to its respective operation angle at a high speed. The performance of the beam reflector (or beam reflecting unit 220) is thus less limited by its "rotating" speed.

Figure 3A:
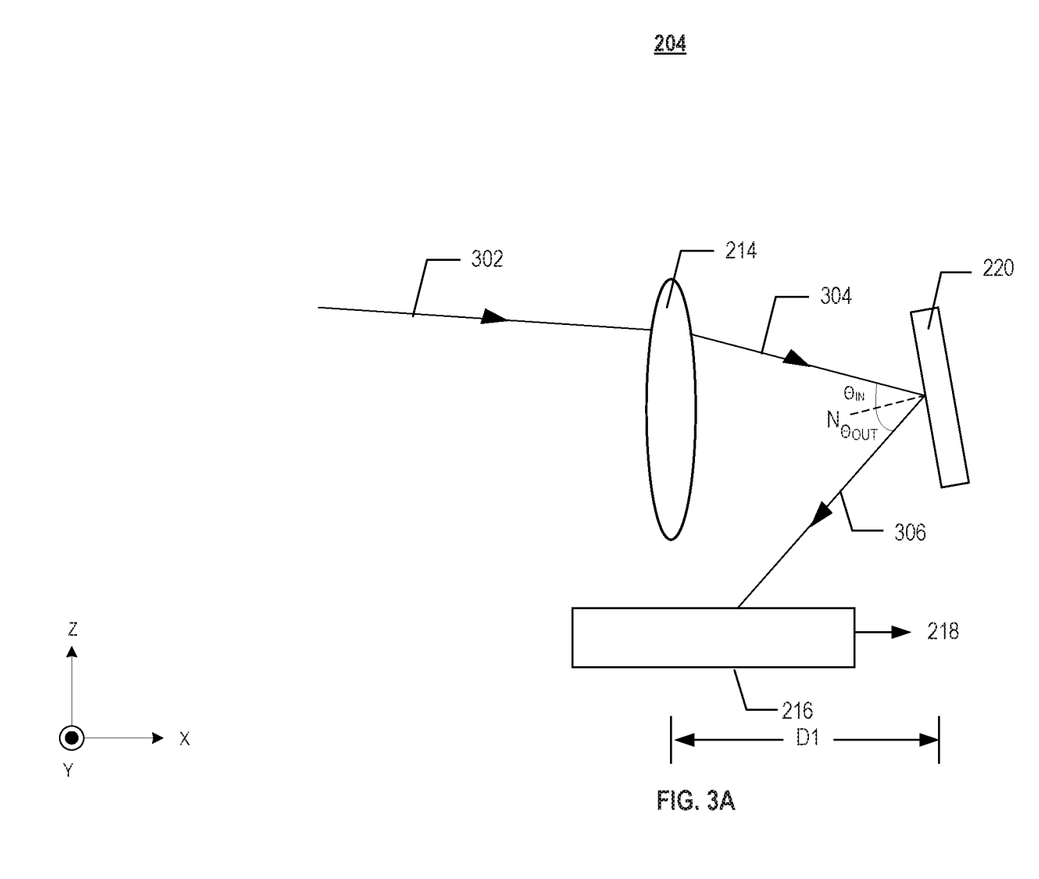
FIG. 3A illustrates a receiver having an exemplary beam reflecting unit, according to embodiments of the disclosure.
Figure 3B:
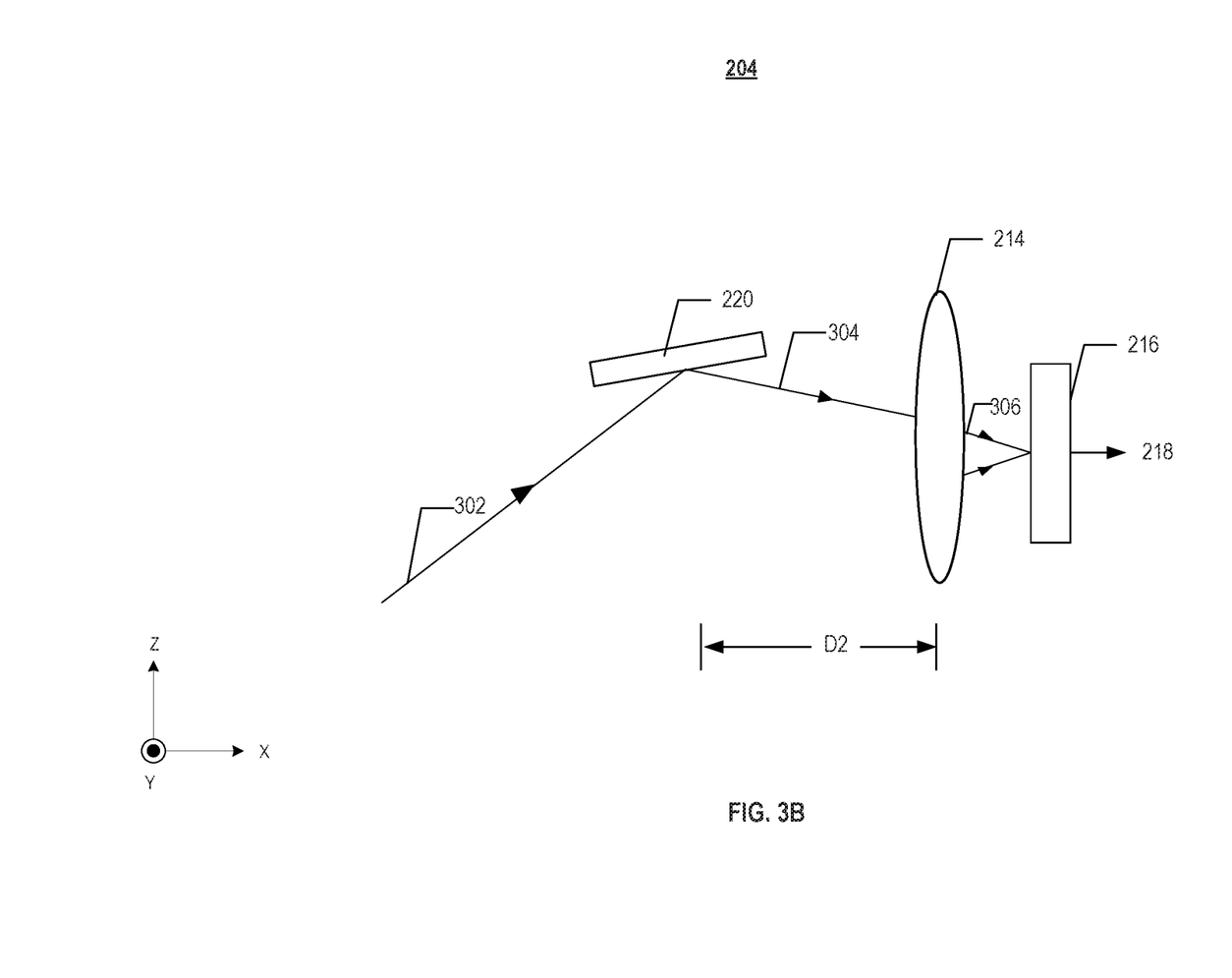
FIG. 3B illustrates another receiver having an exemplary beam reflecting unit, according to embodiments of the disclosure.

FIGS. 3A and 3B each illustrates an exemplary configuration of receiver 204, according to some embodiments. As shown in FIG. 3A, beam reflecting unit 220 may be placed between lens 214 and photosensor 216. A first light beam 302 may represent an input light beam that includes a laser signal (e.g., returned light beam 211) and a noise signal (e.g., any unwanted signal such as sunlight). First light beam 302 may be incident on and converged by lens 214, forming a second light beam 304. Second light beam 304 may be an input light beam that is incident on and reflected by beam reflecting unit 220, forming a third light beam 306. The noise signal can be deflected away (e.g., filtered out) by beam reflecting unit 220. Third light beam 306, including the reflected laser signal, may be collected by photosensor 216, which outputs an electrical signal 218 that can be detected by other hardware and/or software, such as controller 222. It should be noted that, in the present disclosure, the shape and placement of beam reflecting unit 220 is only for illustrating the exemplary travel path of light beams and do not limit the actual arrangement of the beam reflector included in beam reflecting unit 220.

Beam reflecting unit 220 may direct and filter an input light beam (e.g., second light beam 304) to form an output light beam (e.g., third light beam 306), which includes the reflected laser signal and travels towards photosensor 216. Compared to second light beam 304, at least a portion of the noise signal is removed by beam deflecting unit 220 in third light beam 306. That is, beam reflecting unit 220 filter out the noise signals from the output light beam and deflect the laser signal in the output light beam towards photosensor 216 such that the input and output light beams (e.g., the laser signal and the deflected laser signal) do not travel in parallel. The angle between the input and output light beams is represented by the difference between the travel directions of the input and output light beams. The angle can be referred to as the reflection angle of beam reflecting unit 220. In some embodiments, the angle takes a nonzero value. In various embodiments, depending on the position of photosensor 216 relative to beam reflecting unit 220, the output light beam can be deflected by beam reflecting unit 220 for a certain reflection angle to travel towards photosensor 216.

As shown in FIG. 3A, second light beam 304 and third light beam 306 have different travel directions. Second light beam 304 may be incident on beam reflecting unit 220 at an incident angle $\theta_{IN}$ and be reflected to an exiting angle $\theta_{OUT}$, where incident angle $\theta_{IN}$ represents the angle between second light beam 304 and the surface normal N of beam reflecting unit 220, and exiting angle $\theta_{OUT}$ represents the angle between third light beam 306 and the surface normal N of beam reflecting unit 220. In some embodiments, beam reflecting unit 220 includes an array of DMDs for receiving and deflecting second light beam 304 and the surface normal N represents the surface normal of the DMD array. The reflection angle of beam reflecting unit 220 (or a beam reflector) is the angle between second light beam 304 and third light beam 306 (e.g., the input and output light beams), i.e., ($\theta_{IN}+\theta_{OUT}$), where $\theta_{IN}$ may be equal to $\theta_{OUT}$.

In some embodiments, the position of beam reflecting unit 220 is adjustable (e.g., can be optimized) such that the laser signal in second light beam 304 can be received on a desired area of beam reflecting unit 220. In some embodiments, the position of beam reflecting unit 220 is adjusted such that a maximum portion (e.g., all) of the laser signal in second light beam 304 is deflected. In some embodiments, the optimized position of beam reflecting unit 220 also allows third light beam 306 to be incident on photosensor 216. As shown in FIG. 3A, a distance D1 between lens 214 and beam reflecting unit 220 can be determined or optimized to ensure any input light beam of beam reflecting unit 220 (e.g., second light beam 304) to be deflected onto photosensor 216. In various embodiments, D1 can be a constant value or a variable value. In some embodiments, to adjust D1, beam reflecting unit 220 can be coupled to a motor and/or an actuator that can move beam reflecting unit 220 during a laser light detection process. In some embodiments, based on the travel direction of first light beam 302 and/or the relative positions between lens 214 and photosensor 216, the motor/actuator is configured to move beam reflecting unit 220, e.g., along the x-axis and/or the y-axis, to timely deflect the laser signal in second light beam 304 such that third light beam 306 impinges on photosensor 216. In some embodiments, the motor/actuator may be controlled by a controller 222.

Figure 4:
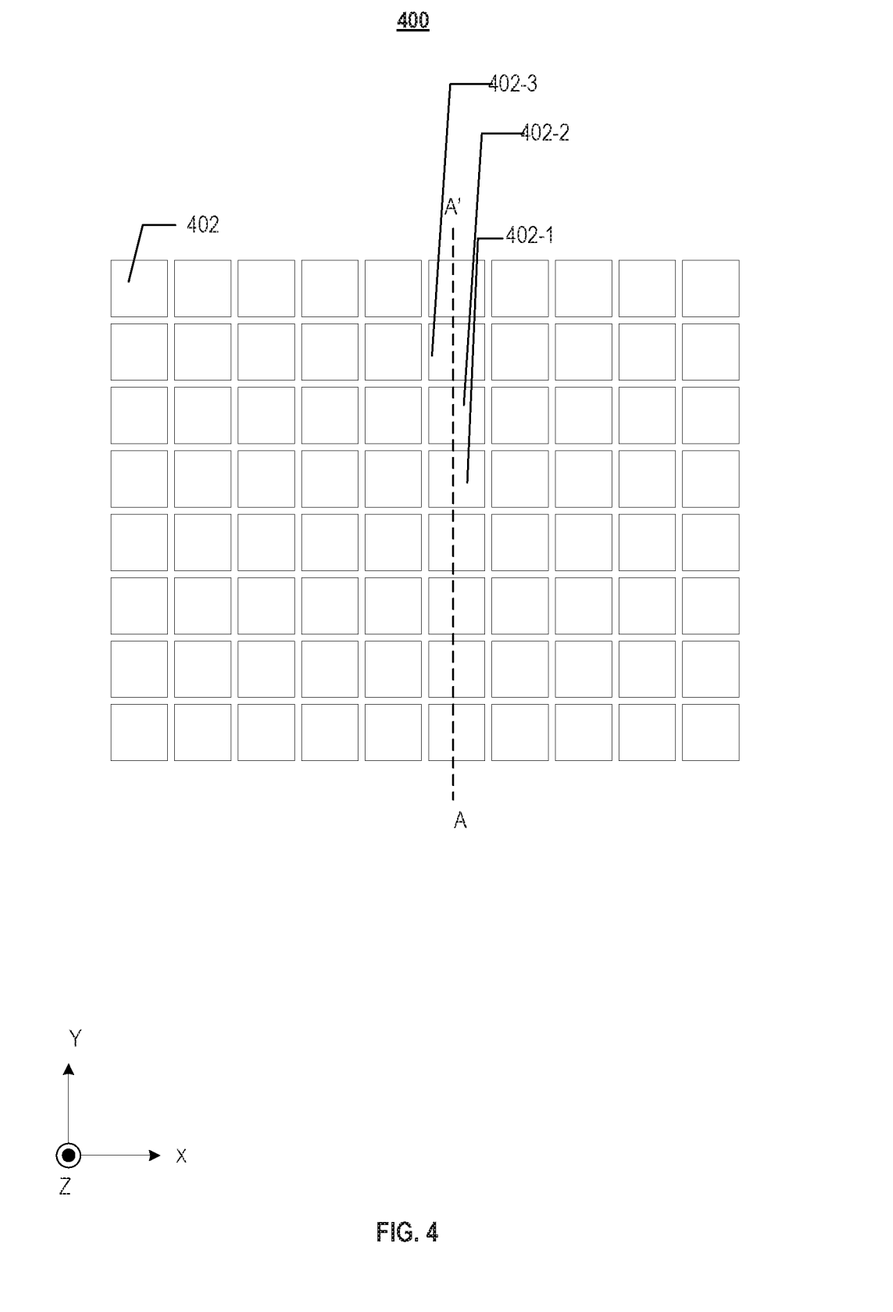
FIG. 4 illustrates a schematic top view of an exemplary beam reflecting unit, according to embodiments of the disclosure.
Figure 5:
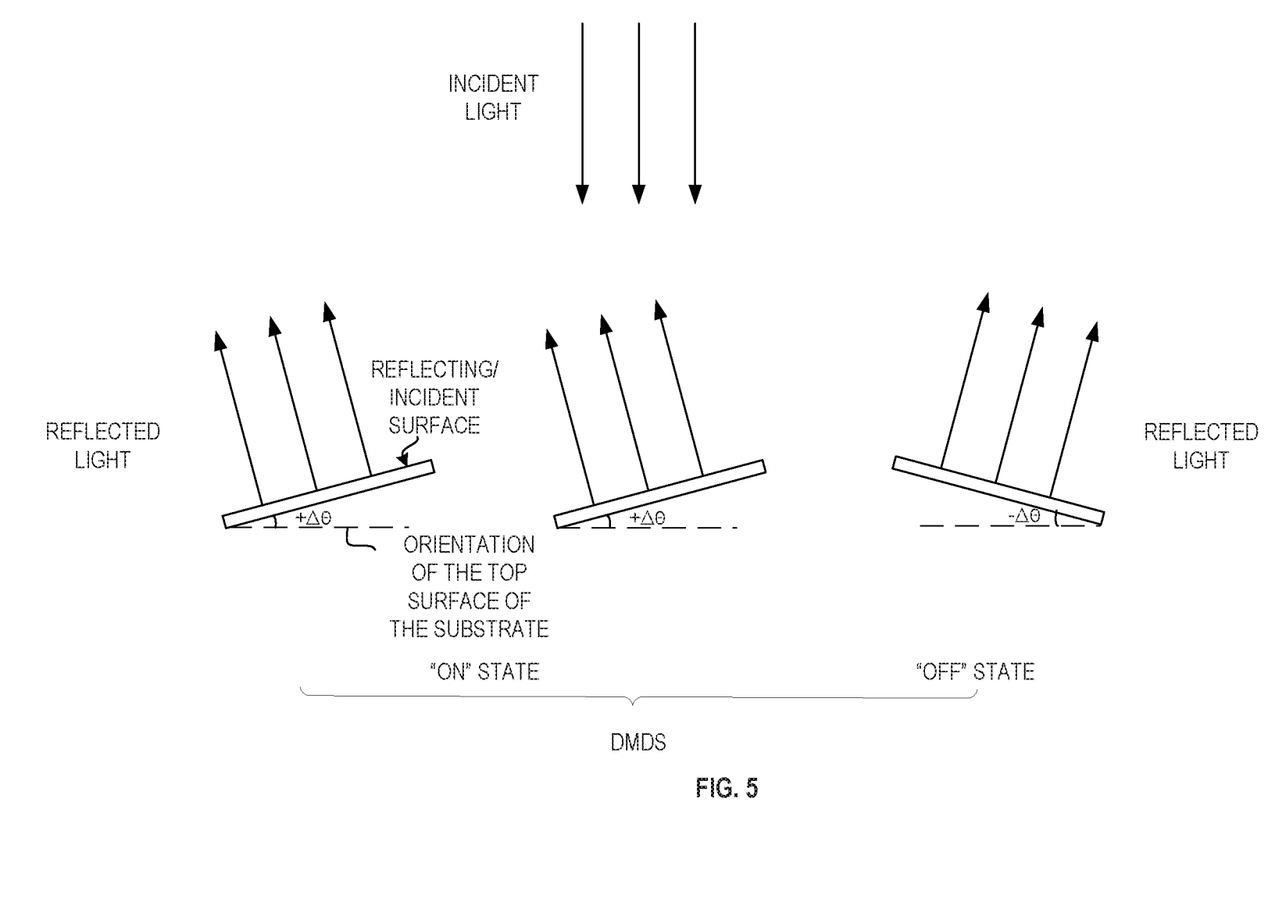
FIG. 5 illustrates a schematic view of a plurality of DMDs in "ON" state or "OFF" state.

FIG. 4 illustrates a top view of a DMD array 400 in a beam reflector. FIG. 5 explains working mechanisms of a DMD array.

FIGS. 4 and 5 are described together, to explain the embodiments of the present disclosure. It should be noted that, the number, arrangement, and shapes of DMDs in the present disclosure are for illustration only and do not limit the number, arrangement, and shapes of DMDs in an actual beam reflector. For example, DMD array 400 may include DMDs 402 arranged in an 8×8 array as illustrated in FIG. 4. FIG. 4 will be used as an example to explain the working mechanism of a beam reflector (or beam reflecting unit 220). In some embodiment, DMD 400 may be the entirety or a portion of a beam reflector (or beam reflecting unit 220), which may include DMDs arranged in a 8×8 array, a 16×8 array, or a 16×16 array, etc. DMDs 402 can each have any suitable shape and they can be arranged sufficiently close to one another to minimize light loss. In some embodiments, DMDs 402 are square-shaped and are each tens of microns in dimension. In some embodiments, the dimensions of a single DMD 402 is determined based on the spot size of the laser signal in an input light beam. For example, the dimensions of a single DMD 402 are sufficiently large to individually deflect the laser signal. The distance between two adjacent DMDs 402 (i.e., the geometric centers of the two adjacent DMDs 402) may be nominally equal to, each about tens of microns. In various embodiments, DMDs may be arranged to collectively form an array of any suitable shape, e.g., a circular shape, square shape, rectangular shape, and/or irregular shape, depending on the design of the beam reflector.

A DMD is an optical micro-electrical-mechanical element that contains a highly reflective micromirror, often made of aluminum, although other reflective materials can also be suitable. As previously described, a DMD may be in an "ON" state to receive and deflect a laser signal towards a desired direction/location to be collected, and may be in an "OFF" state to deflect away any signal (e.g., noise signal) that is not to be collected. The "ON" and "OFF" states may be determined by the operation angle of the DMD. Consistent with the present disclosure, an "operation angle" represents an orientation at which the DMD is in the "ON" state, and an "non-operation angle" represents an orientation at which the DMD is in the "OFF" state. The DMD can be switched to the "ON" state by rotating for a "tilt angle" from an "initial rotation angle" (i.e., an initial orientation of the DMD with no control signal applied) to its operation angle. The DMD can be switched to the "OFF" state by rotating for a "negative tilt angle" from an "initial rotation angle" (i.e., an initial orientation of the DMD with no control signal applied) to its operation angle. The tilt angle of a DMD is determined by geometry and electrostatics of the DMD. For example, FIG. 5 illustrates an example of three DMDs coupled to or mounted on a substrate (not shown in FIG. 5), forming a chip. Two of the DMDs are in the "ON" state and the other is in the "OFF" state.

By convention, the DMD is in an "ON" state when tilted towards the illumination (e.g., the input light beam), and is in an "OFF" state when tilted away from the illumination. As shown in FIG. 5, The DMD is rotated by a tilt angle (+Δθ) from its initial orientation to be switched to the "ON" state, and rotated by a negative tilt angle (−Δθ) from its initial orientation to be switched to the "OFF" state. As shown in FIG. 5, assuming the initial orientation of a DMD (or the receiving/incident surface of the DMD) is parallel with the top surface of the substrate for the DMD, the angle between the receiving/incident surface of the DMD in the "ON" state and the top surface of the substrate would be the tilt angle (+Δθ). Similarly, the angle between the receiving/incident surface of the DMD in the "OFF" state and the top surface of the substrate would be the negative tilt angle (−Δθ). In the present disclosure, when in the "ON" state, DMD 402 directs/reflects the laser signal in the input light beam in a direction towards photosensor 216. When in the "OFF" state, DMD 402 deflects the noise signal in the input light beam in a direction away from photosensor 216. The DMD may be switched between the "ON" and "OFF" states by a respective control laser signal.

Tilt angle Δθ may at least partially impact the reflection angle of the respective DMD (or beam reflector). In some embodiments, the value of Δθ can be any suitable value between 10° and 20°. For example, Δθ may be 10°, 10.5°, 11°, 11.5°, 12°, 12.5°, 13°, 13.5°, 14°, 14.5°, 15°, 15.5°, 16°, 16.5°, 17°, 17.5°, 18°, 18.5°, 19°, 19.5°, 20°. In various embodiments, Δθ can also be any other suitable values. In some embodiments, the operation angle of the DMD is equal to the tilt angle if the DMD is not initially rotated (e.g., have an initial rotation angle of zero or being parallel with the top surface of the substrate), and the non-operation angle of the DMD is equal to the negative tilt angle of the DMD. DMDs formed on the same chip may have the same title angle or different tilt angles. In some embodiments, DMDs formed on the same chip have the same tilt angle. In some embodiments, DMDs formed on the same chip have the same tilt angle and the same negative tilt angle. In various embodiments, the initial rotation angle is determined by the structure and/or mechanical coupling of DMD, and may or may not be adjustable during operation. In an example, the initial rotation angle may be determined during the fabrication of DMD and is not adjustable.

In some embodiments, one or more DMDs in a beam reflector can each have an initial orientation or be initially rotated before the DMDs are rotated by the respective tilt angles. The initial rotation angle is the angle between the incident/receiving surface of a DMD and its substrate when no control laser signal is applied. The initial rotation angle of a DMD may also impact the direction that the incident signal (e.g., laser signal and/or noise signal) is deflected/directed and thus partially determine the reflection angle of the respective DMD (or beam reflector). In some embodiments, the initial rotation angle can be any suitable number between 0° and 90°. For example, the initial rotation angle may be 2°, 5°, 8°, 10°, 12°, 15°, 18°, 20°, 25°, 28°, 30°, 35°, 40°, 45°, 50°, 55°, 60°, 65°, 70°, 75°, 80°, 85°, 89.5°. In some embodiments, the initial rotation angle is between 0° and 30°, and be a fixed value or variable value amongst the DMDs. The specific values of the initial rotation angles should not be limited by the embodiments of the present disclosure. In some embodiments, DMDs in a beam reflector have the same initial rotation angle. In some embodiments, the initial rotation angle of each DMD in a beam reflector is equal to zero. In some embodiments, a portion of DMDs in a beam reflector has non-zero initial rotation angles, e.g., to allow laser signals to be directed to photosensor 216 with a desirably small receiving area.

The operation angle of a DMD is a combination of the respective initial rotation angle and the tilt angle. Likewise, the non-operation angle of the DMD can be a combination of the respective initial rotation angle and the negative tilt angle. For example, the operation angle of a DMD may be the sum of the respective initial rotation angle and the tilt angle, and the non-operation angle of a DMD may be the difference between the respective initial rotation angle and the tilt angle. In operation, the initial rotation angle and the tilt angle of a DMD may be predetermined so that when the DMD is in the "ON" state, it can deflect the laser signal in an incident/input light beam towards a desired direction/position. The operation angle of the DMD thus determines the reflection angle of the DMD (or respective beam reflector).

In some embodiments, all DMDs in a beam reflector (or beam deflecting unit 220) have a same operation angle, simplifying the design and manufacturing of the beam reflector (or beam deflecting unit 220). In some embodiments, certain DMDs in a beam reflector (or beam deflecting unit 220) have a respective operation angle that is different from one another. In various embodiments, the operation angle of any DMD in a beam reflector can then be optimized by individually manipulating the respective initial rotation angle, the respective tilt angle, and/or the combination of the initial rotation angle and the tilt angle. Being adjusted to suitable operation angles, the beam reflector may deflect incident light beams from various different directions each to a sufficiently small photosensor. The optimization of the operation angles of DMDs in a beam reflector can minimize light loss and maximize precision in the deflection of the incident light beam. Because the deflection angle is adjusted through individually tilting the DMDs, instead of physically rotating the DMD array, the disclosed receiver can eliminate the motor/actuator necessary to rotate the conventional rotational mirror. Therefore, the use of DMDs help simplify the design and/or manufacture of the beam reflecting unit.

Referring back to FIG. 4, DMD array 400 includes a plurality of DMDs 402 arranged in an 8×8 array, along the x-y plane. As previously explained, in the present disclosure, the receiving aperture of a beam reflector may be determined by the number of DMDs 402 that can be in the "ON" state. For example, when all DMDs 402 in DMD array 400 can be in the "ON" state (e.g., at different time points to deflect laser signals from various directions), the receiving aperture may be equal to the size/dimensions (e.g., area covered by) of DMD array 400. In various embodiments, the number of DMDs in array 400 may vary, depending on the FOV and/or design of LiDAR system 102. For example, DMD array 400 may be an 8×8 array in a 64-line LiDAR system, a 16×8 array in a 128-line LiDAR system, or a 16×16 array in a 256-line LiDAR system. Because DMDs 402 can individually rotate at a sufficiently fast speed to accommodate the scanning speed of the LiDAR system, the number of DMDs 402 included in DMD array 400 can be increased to achieve a greater receiving aperture, and the response time of DMD array 400 is determined by the response time of the individual DMDs 402 reflecting the laser signal in the input light beam, the size of DMD array 400 thus has little or no impact on the response time of DMD array 400.

The rotation and "ON/OFF" states of DMDs 402 may be controlled by one or more control signals. In some embodiments, one or more DMDs 402 may be coupled to and controlled by synchronized control signals such that these DMDs 402 can be switched to "ON" or "OFF" state at approximately the same time. The location and number of DMDs 402 that are switched to the "ON" state may be determined based on the area laser signal incident on DMD array 400. In some embodiments, one or more DMDs 402 in that area may be switched to the "ON" state simultaneously to reflect the laser signal in an input light beam and the rest DMDs 402 may be switched to the "OFF" state simultaneously to deflect away any other signals (e.g., noise signals) in the input light beam. In some embodiments, each DMD 402 is coupled to and controlled by a respective control signal to rotate the DMD 402 for a predetermined tilt angle to its operation angle in order to be switched to the "ON" state or the "OFF" state.

In some embodiments, DMD array 400 includes m DMDs 402 (e.g., m=64, 128, 256, . . . ), arranged in an array of j rows (e.g., j=8, 16, . . . ) and k columns (e.g., k=8, 16, . . . ), where j and k are both positive integers, and m=j×k. The m DMDs 402 may be operated at the same operation angles. In some embodiments, the non-operation angles of the m DMDs 402 may be the same or different. In some other embodiments, the m DMDs 402 may be operated at n operation angles, n being smaller or equal to m. In some embodiments, the DMDs 402 in each of the j rows have a distinct operation angle, that is, n being equal to j. In some embodiments, DMDs 402 in each of the k columns have a distinct operation angle, that is, n being equal to k. In some embodiments, each of the m DMDs 402 has a distinct operation angle, that is, n being equal to m. In some embodiments, the operation angles of DMDs 402 may be made distinctly by manipulating the associated tilt angles and/or initial rotation angles of the individual DMDs 402. For example, DMDs 402 may be configured with distinct initial rotation angles such that they will be at distinct operation angles after being tilted for a same tilt angle. As another example, DMDs 402 may be configured with a same initial rotation angle but be tilted for distinct tilt angles to arrive at the distinct operation angles. As yet another example, DMDs 402 may be configured with a same initial rotation angle and a same tilt angle to arrive at the same operation angles. In various embodiments, DMDs 402 may have the same negative tilt angle or different negative tilt angles, depending on their respective tilt angles.

Figure 6A:
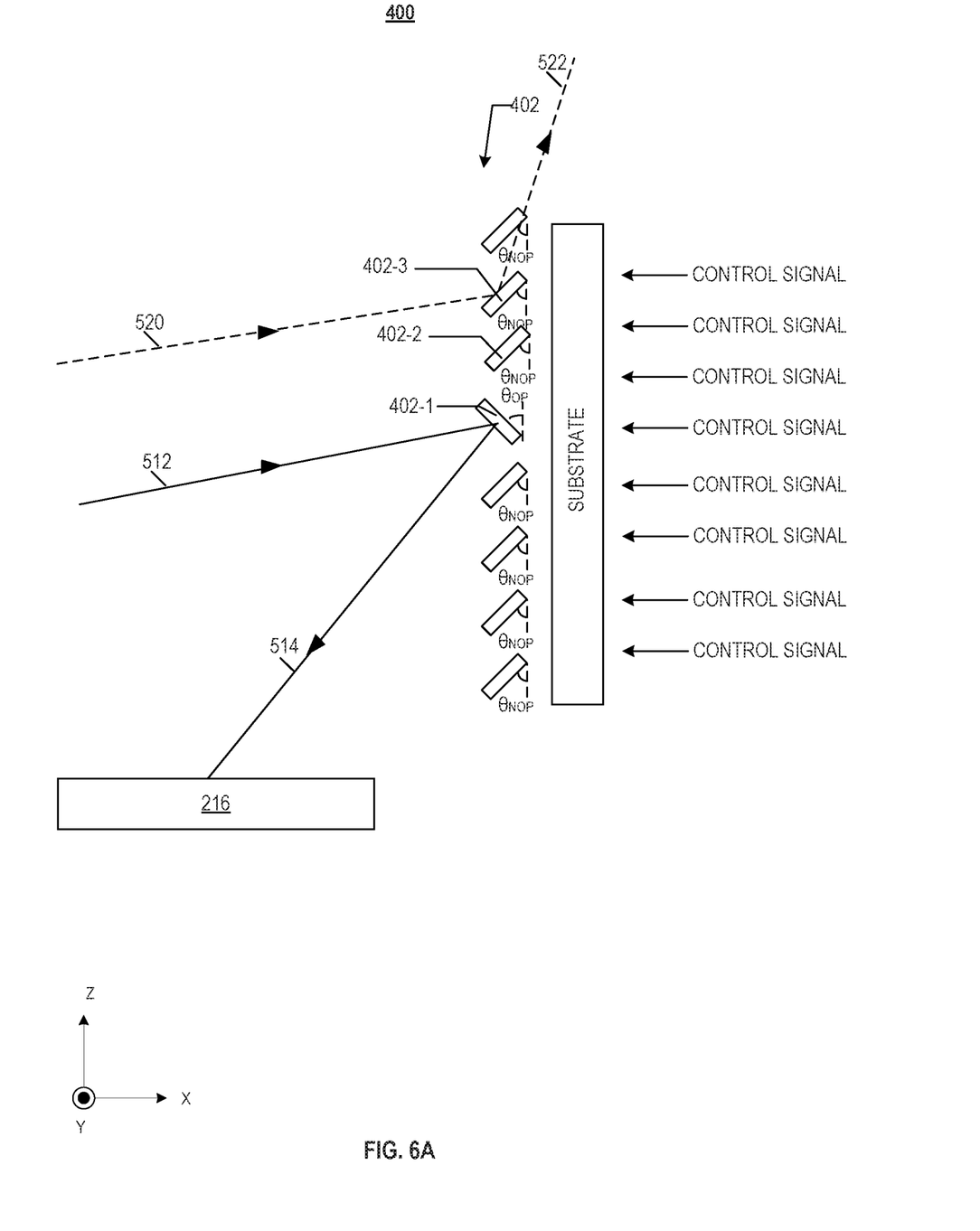
FIGS. 6A and 6B each illustrates an exemplary DMD array operating to selectively reflect signals in input light beams, according to embodiments of the present disclosure.
Figure 6B:
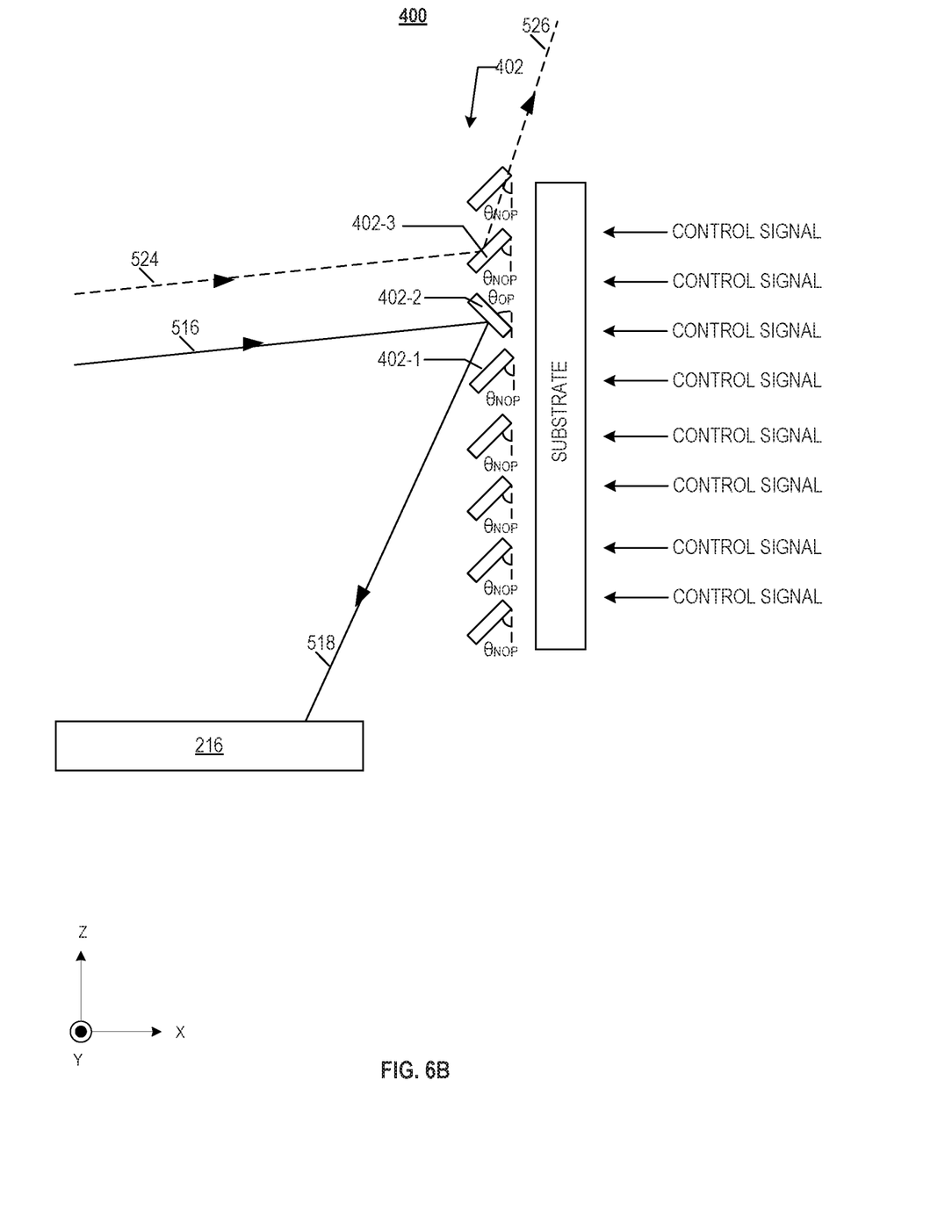

FIGS. 6A and 6B each illustrates an exemplary DMD array operating to selectively reflect signals in input light beams, according to embodiments of the present disclosure. For illustration purpose, FIGS. 6A and 6B show cross-sectional views of a column of DMDs 402 along an A-A' direction shown in FIG. 4.

FIGS. 6A and 6B each illustrates an example in which DMDs 402 in the column having the same operation angle $\theta_{OP}$ and the same non-operation angle $\theta_{NOP}$, which can be a result of the same initial rotation angle and the same tilt angle of each DMD 402. The operation angle of each DMD 402 may be any suitable value between 0° to 90°. As shown in FIGS. 6A and 6B, each DMD 402 may be coupled to or mounted on a substrate through any suitable mechanical and/or electrical couplings (not shown), and may be coupled to and controlled by a respective control signal. In operation, each DMD 402 may be individually controlled to be rotated upon receiving the respective control signal. When DMD 402 receives an "ON" signal (e.g., a signal switching DMD 402 to the "ON" state), DMD 402 may be rotated to the respective operation angle to direct a laser signal (e.g., the laser signal in the input light beam) toward a desired direction/location. When DMD 402 receives an "OFF" signal (e.g., a signal switching DMD 402 to the "OFF" state), DMD 402 may be rotated to the respective non-operation angle and direct a signal (e.g., the noise signal in the input light beam) away from photosensor 216.

As shown in FIGS. 6A and 6B, control signals may be applied to respective DMDs 402 so that DMDs 402 can each be further rotated by the respective tilt angle to reach the respective operation angle $\theta_{OP}$ or $\theta_{NOP}$. The operation angles of DMDs 402 may thus be equal to the combination of the respective initial rotation angles and the respective tilt angles. Details of the working mechanisms of DMD array 400 is described as follows. For simplicity of illustration, noise signals 520 and 524 (along with deflected noise signal 522 and 526) are used to generally represent any noise signal and deflected noise signal from any input light beam.

In operation, only a subset of DMDs 402, e.g., determined to receive and deflect the laser signal in an input light beam, are switched to the "ON" state at any given time during light deflection, and other DMDs 402 in DMD array 400 are switched to the "OFF" state to receive and deflect the noise signal in the input light beam. For example, depending on the incident direction of the input light beam and the area the laser signal impinges on DMD array 400, one or more selected DMD(s) 402 in the area may be switched to the "ON" state to deflect the laser signal in the input light beam to a desired direction towards photosensor 216. Meanwhile, DMDs 402 outside of the area may be switched to the "OFF" state to the noise signal in the input light beam away from photosensor 216. In some embodiments, a single DMD 402 is switched to the "ON" state to receive and deflect the laser signal in an input light beam, and all other DMDs 402 in DMD array 400 are switched to the "OFF" state to receive and deflect away the noise signal in the input light beam.

In some embodiments, during a LiDAR scan, transmitter 202 may sequentially emit laser beams (e.g., combined laser beam 209) to the object at different scanning angles. The laser beams may be reflected to receiver 204 as a laser signal (e.g., returned laser beam 211). Noise signal, such as sunlight, can be reflected to receiver 204 along with the laser signal. In the example shown in FIG. 6A, DMD array 400 is configured to reflect an input light beam that includes a laser signal 512 and a noise signal 520. Based on the travel direction and the area of impingement of the laser signal, some DMDs 402 in the respective area, such as DMD 402-1 shown in FIGS. 4 and 6A, may be selected and tilted to its operation angle $\theta_{OP}$ and thus switched to the "ON" state. DMDs 402 other than 402-1 in DMD array 400, such as DMDs 402-2 and 402-3, may be tilted to their respective non-operation angles $\theta_{NOP}$. Accordingly, control signals are applied to cause DMD 402-1 to rotate to the "ON" state and cause remaining DMDs such as DMDs 402-2 and 402-3 to rotate to the "OFF" state. In some embodiments, laser signal 512 is incident on the top surface of DMD 402-1 and deflected in a desired direction towards a location on photosensor 216 as deflected laser signal 514. In the meantime, noise signal 520 may be incident on one or more DMDs 402 other than DMD 402-1 which are in the "OFF" state, such as DMDs 402-3, and deflected away from photosensor 216.

In some embodiments, based on the travel direction and the area of impingement of the next laser signal at the next time point, e.g., the second time point, some other DMDs 402 in the respective area, may be tilted to its operation angle $\theta_{OP}$. For example, second input light beam (e.g., light beam 304), including laser signal 516 and noise signal 520, traveling in a different direction, may be incident on DMD array 400. FIG. 6B shows that DMD array 400 is configured to reflect another input light beam, coming from a different direction, that includes a laser signal 516 and a noise signal 524. In some embodiments, laser signals 512 and 516 are returned from the object at different time points, for example, corresponding to different scanning angles of scanner 210. As shown in FIGS. 4 and 6B, laser signal 516 is incident on the top surface of DMD 402-2. Control signals are applied to cause DMDs 402-2 to be switched to "ON" state and cause remaining DMDs such as DMDs 402-1 and 402-3 to be switched to "OFF" state. Accordingly, DMD 402-2 becomes in the "ON" state, with other DMDs, such as DMDs 402-1 and 402-3, switched to the "OFF" state. As a result, laser signal 516 is deflected by DMD 402-2 in a desired direction towards a different location on photosensor 216 as deflected laser signal 518 (compare to deflected laser signal 514 in FIG. 6B). In the meantime, noise signal 524 may be incident on one or more DMDs 402 other than DMD 402-2 and in the "OFF" state, such as DMD 402-3, and deflected away from photosensor 216 as deflected noise signal 526. By sequentially switching DMDs 402 to the "ON" state at different areas, the DMD array can deflect incident laser signals coming from different directions, thus covering the scanning FOV. As a result, the various laser signals coming from different directions may be deflected to the same location to be collected by a single photodetector (i.e., photosensor 216).

In some embodiments, at any given time, only one selected DMD 402, such as DMD 402-1 (in FIG. 6A) or DMD 402-2 (in FIG. 6B), may be switched on in DMD array 400, and other DMDs 402 are in the "OFF" state. In some other embodiments, multiple DMDs 402 may be switched to the "ON" state simultaneously to deflect the laser signal in an input light beam received by the multiple DMDs 402. For example, the total area of DMDs 402 in the "ON" state at the same time point may cover the spot size of the laser signal. The DMDs 402 that are simultaneously switched to the "ON" state in operation may have the same operation angle suitable for deflecting the input light beam coming in a specific direction at the given time.

FIG. 3B illustrates another configuration of receiver 204, according to some embodiments. As shown in FIG. 3B, beam reflecting unit 220 may be placed between object 212 (referring to FIG. 2) and lens 214. First light beam 302 may be an input light beam that includes a laser signal (e.g., returned light beam 211) and a noise signal (e.g., any unwanted signal such as sunlight). The laser signal in first light beam 302 may be incident on and deflected by beam reflecting unit 220, forming second light beam 304, which includes the deflected laser signal and at least a reduced amount of the noise signal. The noise signal in first light beam 302 can be deflected away by beam reflecting unit 220 from photosensor 216. Second light beam 304 may be incident on and converged by lens, forming third light beam 306, which includes the deflected laser signal. Third light beam 306 may be collected by photosensor 216, which outputs an electrical signal 218 that can be detected by other hardware and/or software, such as controller 222.

Similar to beam reflecting unit 220 illustrated in FIG. 3A, first light beam 302 and second light beam 304 may respectively be the input and output light beams of beam reflecting unit 220. Second light beam 304 may be deflected by beam reflecting unit 220 before being received by lens 214. A distance between beam reflecting unit 220 and lens 214 may be D2, which can be adjusted through a motor/actuator coupled to beam reflecting unit 220, similar to D1. Also, the orientation of beam reflecting unit 220 (e.g., each beam reflectors in beam reflecting unit 220) can be adjusted/optimized by rotating beam reflecting unit 220 using the motor/actuator. The details of the working mechanism described in connection with FIGS. 3A, 4, 5, 6A, and 6B may also apply to beam reflecting unit 220 in FIG. 3B, and therefore are not repeated herein.

Referring back to FIG. 2, photosensor 216 may be a single piece of sensor large enough to detect light signals returned in the entire receiver FOV. In some embodiments, photosensor 216 may include any photo-sensitive material that can convert light (i.e., photons) into an electric current (e.g., electrical signal 218). Photosensor 216 can also be referred to as a beam sensor. In some embodiments, photosensor 216 includes a single photodetector, e.g., an avalanche photodiode (APD). Because only a portion of the light beam (e.g., the laser signal therein) impinging on a selected area of beam reflecting unit 220 will be reflected towards photosensor 216, the reflected light signal can be detected by a small area on photosensor 216. In some embodiments, photosensor 216 includes a photodetector array. The electric current is generated when photons are absorbed in the photodiode. By using beam reflecting units, the laser signal (e.g., returned laser beam 211) can be quickly and effectively detected by photosensor 216. High-speed scanning can be achieved.

Controller 222 may be configured to control transmitter 202 and/or receiver 204 to perform detection/sensing operations. In some embodiments, controller 222 may apply an electrical signal to each DMD in beam reflecting unit 220 to individually control the "ON" and "OFF states of the DMDs, in order to deflect the laser signal and deflect away the noise signal. In some embodiments, to switch a DMD to the "ON" state, the control signal applied may cause the DMD to rotate by a tilt angle to its operation angle. For example, controller 222 may be configured to determine the proper control signal, to tilt the DMD by the desired tilt angle. In some embodiments, the intensity of the control signal may be proportional to the desired tilt angle. In some embodiments, to switch a DMD to the "OFF" state, the control signal applied may cause the DMD to rotate by a negative tilt angle to its non-operation angle.

Controller 222 may include components (not shown) such as a communication interface, a processor, a memory, and a storage for performing various control functions. In some embodiments, controller 222 may have different modules in a single device, such as an integrated circuit (IC) chip (implemented as, for example, an application-specific integrated circuit (ASIC) or a field-programmable gate array (FPGA)), or separate devices with dedicated functions. In some embodiments, the processor may include any appropriate type of general-purpose or special-purpose microprocessor, digital signal processor, or microcontroller. The memory or storage may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. For example, the memory and/or the storage may be configured to store program(s) that may be executed by the processor to control the operation of beam reflecting unit 220 to deflect the laser signals in desired directions.

Figure 7:
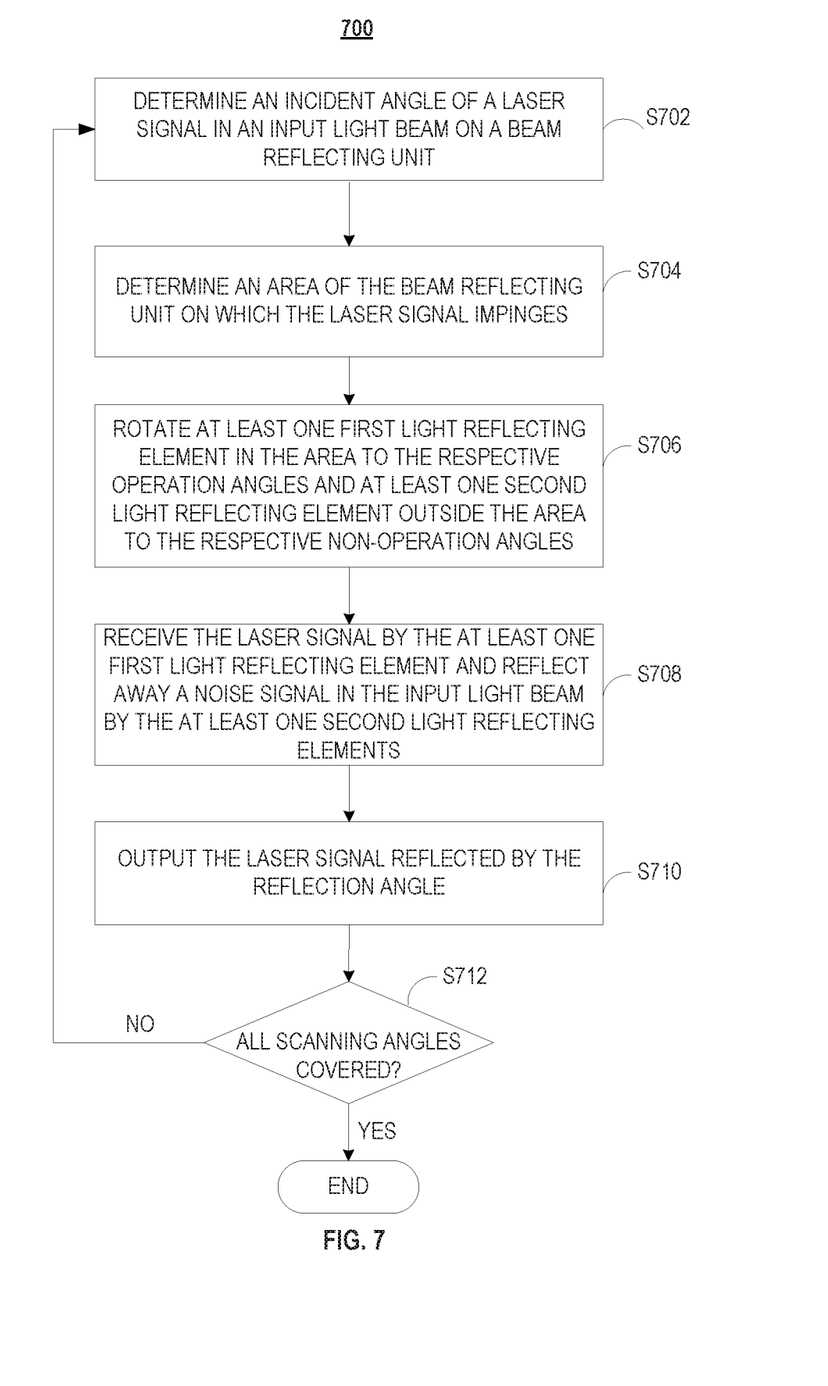
FIG. 7 illustrates a flowchart of an exemplary method to selectively reflect signals in input light beams using a beam reflecting unit, according to embodiments of the disclosure.

FIG. 7 illustrates a method 700 using the disclosed beam reflecting unit to deflect laser signals for collection and deflect away noise signals in input light beams in a receiver of a LiDAR system, according to embodiments of the present disclosure. In some embodiments, method 700 is performed by beam reflecting unit 220, controller 222 along with components of receiver 204. In some embodiments, the beam reflecting unit may include a plurality of light reflecting elements (e.g., DMDs) for receiving and deflecting input light beams.

At step S702, the beginning of method 700, an incident angle of a laser signal in an input light beam on a beam reflecting unit is determined. The laser signal may be a returned laser beam, formed by a laser beam emitted by a transmitter of the LiDAR system to an object and then returned from the object. In some embodiments, travel direction of the laser signal is determined based on the scanning angle of the laser signal, e.g., before impinging on the object. The scanning angle can be within a range of angles depending on the transmitter FOV. For example, controller 222 may receive scanning parameters used by transmitter 202. In some embodiments, controller 222 may be the same controller that determine the scanning parameters and therefore have the parameters saved in its memory/storage. In some embodiments, controller 222 may adjust the scanning angle based on the reflection angle of lens 214, in order to determine the incident angle.

At step S704, an area of the beam reflecting unit on which the laser signal impinges is determined. Based on the travel direction of the laser signal, an area of the beam reflecting unit (or each beam reflector in the beam reflecting unit) on which the laser signal impinges can be determined. In some embodiments, the area is sufficiently large to cover the spot size of the laser signal.

At step S706, at least one first light reflecting element in the area is rotated to respective operation angles and at least one second light reflecting element outside the area is rotated to the respective non-operation angles. In some embodiments, the number of light reflecting elements in the area is sufficiently large to maximize the amount of laser light being deflected and minimize laser light loss. At least a portion of the noise signal in the input light beam may impinge, e.g., outside the area, on the at least one second light reflecting element. In some embodiments, the at least one light reflecting element includes a single light reflecting element, and the at least one second light reflecting element includes the rest of the light reflecting elements in the beam reflecting unit (or the beam reflector). The at least one first light reflecting element may be switched to the "ON" state, and the at least one second light reflecting element may be switched to the "OFF" state. In some embodiments, each light reflecting element is switched to the "ON" or "OFF" status by a control signal, which controls the light reflecting element to rotate by the tilt angle or negative tilt angle. In some embodiments, the control signal may be determined according to the tilt angle or negative tilt angle required for the respective light reflecting element.

In some embodiments, when a selected light reflecting element is oriented at the operation angle, the laser signal in the input light beam may impinge on the light reflecting elements at a reflection angle. In some embodiments, the light reflecting elements are selected such that a maximum portion of the laser signal (e.g., all of the laser signal) is received on the light reflecting element of each beam reflector. In some embodiments, because the initial rotation angle may be a predetermined feature of each light reflecting element and the operation angle is equal to a combination of an initial rotation angle and the tilt angle of the light reflecting element, the tilt angle needed to tilt the light reflecting element to the operation angle can be determined. For example, if the initial rotation angle is zero, the operation angle is equal to solely the tilt angle of the light reflecting element. In some embodiments, when a light reflecting element is oriented at the non-operation angle, the noise signal in the input lase beam may impinge on the light reflecting element at the non-operation angle. Because the non-operation angle is a combination of the initial rotation angle and the negative tilt angle, and is different from the operation angle, the noise signal may be deflected away from photosensor 216 along a direction different from that of the laser signal.

At step S708, the input light beam is received by the beam reflecting unit so that the laser signal impinges on the at least one first light reflecting elements, selected in step S704 and switched to the "ON" state in step S706. Meanwhile, the noise signal in the input light beam may partially or fully impinge on the at least one second light reflecting elements that are switched to the "OFF" state in step S706. For ease of illustration, the laser signal herein can be the laser signal before or after being converged by the lens in the receiver, e.g., similar to the laser signal described in FIGS. 3A and 3B. At step S710, the laser signal is deflected by the reflection angle of the beam deflecting unit towards a predetermined area. The deflected laser signal may then be outputted by the beam reflecting unit and received by a photosensor positioned at the predetermined area. In the meantime, the noise signal is deflected away from the predetermined area by the beam deflecting unit and is not collected by the photosensor.

In some embodiments, after step S710, method 700 proceeds to step S712, which decides whether all scanning angles of the LiDAR system have been covered. If yes, method 700 ends. If no, method 700 returns to step S702, to adjust the beam deflecting unit such that it can receive and deflect another laser signal emitted at the next scanning angle. Method 700 may repeat steps S704-S710 to deflect the other laser signal towards the photosensor and deflect the noise signal away from the predetermined area using different light reflecting elements in the beam reflecting unit. In some embodiments, the areas of impingement for the laser signal and the other laser signal are determined to be different in step S704, and light reflecting elements selected to reflect the laser signal and the other laser signal are different in step S706. Accordingly, the light reflecting elements for deflecting away the noise signals respectively with the laser signal and the other laser signal are also determined to be different in step S706. In some embodiments, the deflected laser signals may be received at different positions on the photosensor in step S710. Steps S702-S710 may be repeated for laser signals correspond to each scanning angle until all scanning angles of the LiDAR system have been covered.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A receiver for light detection and ranging (LiDAR), comprising:
    a beam reflecting unit comprising a plurality of digital micromirror devices (DMDs), the beam reflecting unit configured to:
    receive an input light beam returned from an object being scanned by the LiDAR;
    reflect a signal in the input light beam by at least one first DMD selectively switched to an "ON" state at an operation angle to form an output signal towards a detector;
    reflect a noise signal in the input light beam away from the detector by at least one second DMD selectively switched to an "OFF" state at a non-operation angle;
    the detector configured to receive the output signal; and
    a controller configured to:
        determine an area in which the input light beam impinges on the beam reflecting unit based on an estimated direction of the signal; and
        select the at least one first DMD located in the area to be switched to the "ON" state.

2. The receiver of claim 1, wherein each DMD is used either as a first DMD or a second DMD.

3. The receiver of claim 1, wherein the plurality of DMDs are arranged in a 2D array.

4. The receiver of claim 1, wherein the signal impinges on the beam reflecting unit in the area where the at least one first DMD is located.

5. The receiver of claim 4, wherein the controller is further configured to:
    provide a first control signal to switch the at least one first DMD located in the area to the "ON" state.

6. The receiver of claim 5, wherein the controller is further configured to:
    provide a second control signal to switch the at least one second DMD located outside the area to the "OFF" state.

7. The receiver of claim 6, wherein the controller is further configured to:
    adjust the first DMD to the operation angle by rotating it by a respective tilt angle from a respective initial rotation angle; and
    adjust the second DMD to the non-operation angle by rotating it by a respective negative tilt angle from a respective initial rotation angle.

8. The receiver of claim 7, wherein the respective tilt angle of the first DMD is the same as the respective tilt angle of the second DMD.

9. The receiver of claim 1, wherein each of the plurality of DMDs has the same operation angle.

10. The receiver of claim 1, wherein the detector is a single piece of photodetector.

11. A receiver for light detection and ranging (LiDAR), comprising:
    a beam reflecting unit comprising a plurality of digital micromirror devices (DMDs) including a first DMD and a second DMD, the beam reflecting unit configured to:
    reflect a first signal in a first input light beam from an object being scanned by the LiDAR in a first direction by the first DMD to form a first output signal; and
    reflect a second signal in a second input light beam from the object in a second direction by the second DMD to form a second output signal, the first DMD being different from the second DMD;
    a detector configured to receive the first and second output signals; and
    a controller configured to:
        determine a first area in which the first signal impinges on the beam reflecting unit based on the first direction;
        select the first DMD located in the first area;
        determine a second area in which the second signal impinges on the beam reflecting unit based on the second direction; and
        select the second DMD located in the second area.

12. The receiver of claim 11, wherein the controller is further configured to:
    generate a respective control signal to switch the first and second DMDs to an "ON" state.

13. The receiver of claim 12, wherein the controller is further configured to adjust the first DMD to an operation angle by rotating it from an initial rotation angle by a tilt angle.

14. The receiver of claim 13, wherein the plurality of DMDs further includes a third DMD configured to reflect a noise signal in the first input light beam away from the detector, wherein the third DMD is adjusted to a non-operation angle.

15. A method for receiving a laser beam comprising an input light beam and a noise signal in a light detection and ranging (LiDAR), comprising:
    determining an area on a beam reflecting unit on which a signal in the input light beam from an object being scanned by the LiDAR impinges, the beam reflecting unit having a plurality of digital micromirror devices (DMDs);
    switching at least one first DMD in the area to an "ON" state by rotating the at least one first DMD to a respective operation angle based on the determination;
    receiving the signal on the at least one first DMD;
    switching at least one second DMD outside the area to an "OFF" state by rotating the at least one second DMD to a respective non-operation angle;
    receiving the noise signal in the input light beam on the at least one second DMD;
    reflecting the signal towards a detector; and
    reflecting the noise signal away from the detector.

16. The method of claim 15, further comprising:
determining another area of the beam reflecting unit on which another signal in another input light beam from the object impinges;
switching at least one third DMD in the other area to an "ON" state by rotating the third DMD to a respective operation angle;
receiving the other signal on the at least one third DMD; and
reflecting the other signal towards the detector.

17. The method of claim 16, further comprising switching at least one fourth DMD outside the other area to an "OFF" state by rotating the at least one fourth DMD to a respective non-operation angle;
receiving another noise signal on the at least one fourth DMD; and
reflecting the other noise signal away from the detector.

18. The method of claim 15, wherein switching the at least one second DMD outside the area to an "OFF" state comprises switching all remaining DMDs other than the at least one first DMD 5 to the "OFF" state.

19. The method of claim 15, further comprising:
determining a travel direction of the input light beam; and
selecting the at least one first DMD from the plurality of DMDs based on the travel direction such that the at least one first DMD, at the respective operation angle, reflects the laser beam towards the detector.

\* \* \* \* \*